United States Patent [19]

Vardeman et al.

[11] Patent Number: 5,307,611
[45] Date of Patent: May 3, 1994

[54] VEHICLE STEERING CONTROL SYSTEM

[75] Inventors: Wendell D. Vardeman; Raymond D. Vardeman; Wendell K. Vardeman, all of Slaton, Tex.

[73] Assignee: Orthman Manufacturing, Inc., Lexington, Nebr.

[21] Appl. No.: 947,342

[22] Filed: Sep. 18, 1992

[51] Int. Cl.⁵ .......................................... A01D 75/14
[52] U.S. Cl. ............................. 56/10.2; 56/DIG. 15
[58] Field of Search .............. 56/10.2 E, 10.2 F, 10.2, 56/DIG. 15; 180/900

[56] References Cited

U.S. PATENT DOCUMENTS

| | | | |
|---|---|---|---|
| 3,208,535 | 9/1965 | Fischer | 172/6 |
| 3,425,495 | 2/1969 | Reeve et al. | 172/1 |
| 3,492,949 | 2/1970 | Brown | 104/244.1 |
| 3,550,362 | 12/1970 | Graeber | 56/25 |
| 3,683,547 | 8/1972 | Harden | 47/1.7 |
| 3,844,224 | 10/1974 | Ishil et al. | 104/244.1 |
| 4,166,349 | 9/1979 | Coenenberg et al. | 56/10.2 |
| 4,428,449 | 1/1984 | Lang | 180/131 |
| 4,726,175 | 2/1988 | Day, V et al. | 56/10.2 |
| 5,010,719 | 4/1991 | Korthuis | 56/10.2 |
| 5,203,148 | 4/1993 | Schreiner et al. | 56/10.2 |

FOREIGN PATENT DOCUMENTS 0136548 1/1988 European Pat. Off. .

Primary Examiner—Mark Rosenbaum
Assistant Examiner—John M. Husar
Attorney, Agent, or Firm—Zarley, McKee, Thomte, Voorhees & Sease

[57] ABSTRACT

A steering probe for controlling the steering of an agricultural vehicle along a path corresponding to a crop row includes a yoke pivotally mounted to the vehicle and having arms extending downwardly on opposite sides of the crop row. The yoke is pivotally mounted adjacent its upper end for pivotal movement about a horizontal axis. A sensor is connected to the probe adjacent its pivotal mounting to the vehicle, and senses the rotational position of the yoke. The lower ends of the yoke engage the opposite sides of the crop row, and the yoke pivots from its neutral position about the pivotal axis whenever the vehicle becomes misaligned with the crop row. The sensor senses the rotation of the yoke and causes the vehicle to be steered to compensate for the misalignment with the crop row.

8 Claims, 3 Drawing Sheets

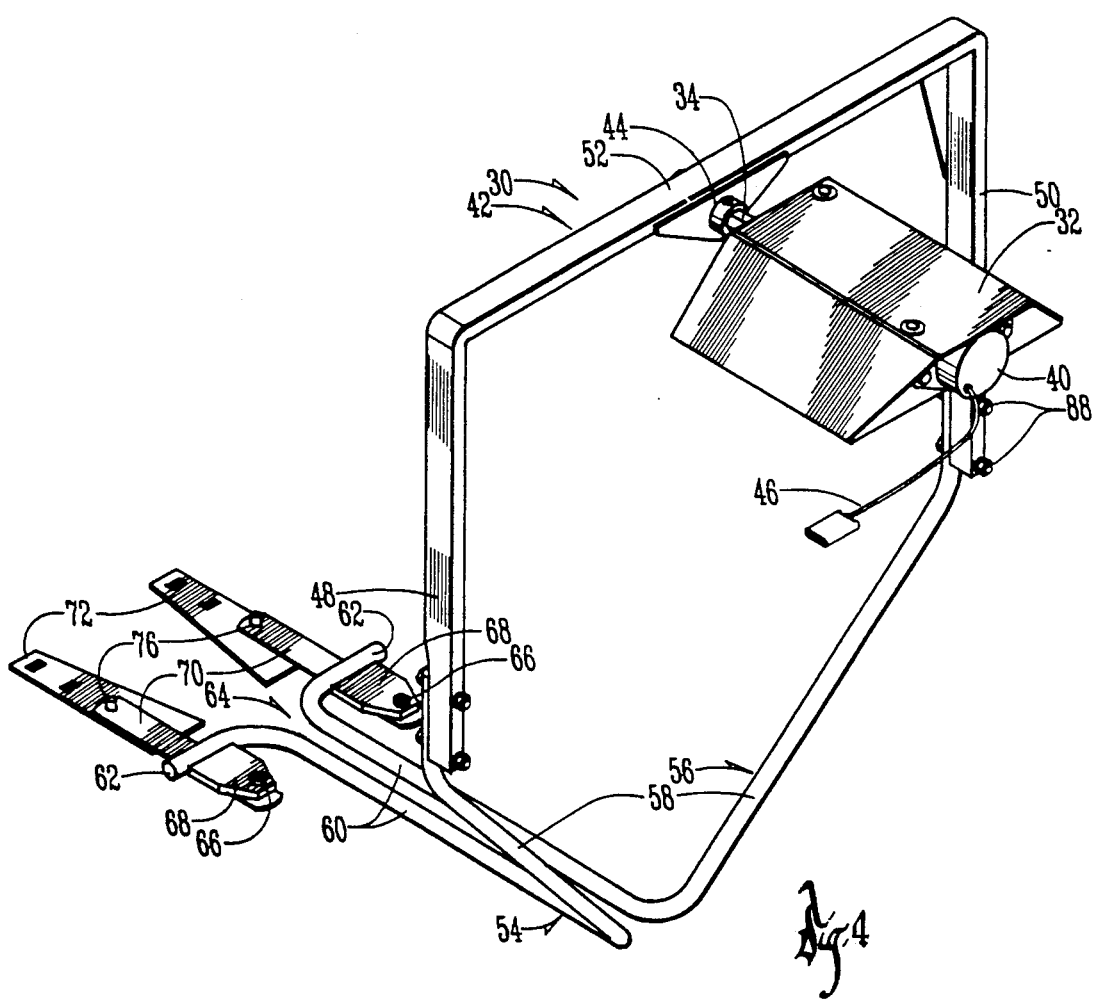

VEHICLE STEERING CONTROL SYSTEM

BACKGROUND OF THE INVENTION

This invention relates to a vehicle steering control system, and specifically to an improved vehicle control system for agricultural vehicles used in harvesting, cultivating, or otherwise treating row crops.

Several problems are encountered in harvesting some crops with a self-propelled harvesting device. For example, in the harvesting of cotton with a self-propelled cotton stripper, the harvesting speed of the stripper will vary from one mile per hour to 7.5 miles per hour depending upon the crop yield, field conditions, and the ability of the operator to keep the cotton stripper aligned with the crop row. The ability to keep the cotton stripper aligned with the row will vary greatly depending upon the experience, coordination, and fatigue of the operator. In the harvesting of cotton, precise alignment with the row is important; otherwise, the nylon stripping brushes of the cotton stripper do not remove all of the cotton from the stalks and an unharvested patch of cotton will be left in the field.

Therefore, automatic guidance control systems have been provided for guiding the vehicle relative to the crop row being harvested. One factor which affects the such guidance systems is the size, shape, and consistency of the crop stand, and the stiffness of the plants being harvested. Cotton, which is typically harvested with a cotton stripper, can range from four feet in height and over two feet in width down to a single stalk which is only twelve inches tall. The delicate nature of the newly emerged cotton plant can also cause frequent skips in the crop row where the plants have not survived Certain cotton varieties and certain growing conditions also tend to produce a cotton plant which has several branches reaching out and up at the ground level.

Another factor which affects the ability of the guidance system to operate effectively is the nature of the cotton stripper itself. Each row unit of the cotton stripper includes an automatic individual height adjustment which allows the nylon stripper brushes to run very close to the ground without gouging into the ground. The row units are also designed not to disturb the cotton plant before the plant is well into the row unit itself. To disturb the plant ahead of the row unit may shake loose the cotton bolls and contribute to yield losses.

Therefore, a primary object of the present invention is the provision of an improved steering control system for an agricultural vehicle used in connection with a row crop.

A further object of the present invention is the provision of an improved steering control system which includes a probe operating as a pendulum, with the pivotal axis of the pendulum being located a substantial distance above the ground.

A further object of the present invention is the provision of an improved vehicle steering control system which includes a probe having spaced apart arms which are adapted to embrace he opposite sides of the crop row being followed and crowds the lower crop branches upwardly so as to find the true center of the row.

A further object of the present invention is the provision of an improved control system which can be easily used in combination with the independent height control of each row unit of a cotton stripper.

A further object of the present invention is the provision of an improved steering control system which includes a sensor located substantially above the plants in the row crop so as to keep the moving parts and electrical parts out of the dirt and dust below the row unit of the cotton stripper.

A further object of the present invention is the provision of an improved vehicle steering control system which permits precise control of the vehicle with respect to the crop row being followed.

A further object of the present invention is to provide an improved vehicle steering control probe which is supported in both the front and rear so as to withstand forces exerted by the crop row during forward and rear movement of the vehicle.

A further object of the present invention is the provision of an improved vehicle steering control system which is economical to manufacture, simple in construction, and durable in use.

SUMMARY OF THE INVENTION

The steering probe of the present invention is comprised of a yoke having a pair of spaced apart yoke arms which extend downwardly in spaced apart relation from one another. The lower ends of the yoke arms extend inwardly toward one another and terminate in spaced relation to one another. The yoke is pivotally mounted about a horizontal axis adjacent the upper ends of the yoke arms. A shaft is fixed to the yoke and provides the pivotal axis. The shaft extends into a box which is mounted rigidly to the vehicle being steered. The box includes bearings for receiving the shaft and also includes a sensor which is attached to the shaft. The sensor is adapted to sense the rotational position of the shaft and to create a data signal which can be communicated to a microprocessor steering control system for the vehicle.

The yoke arms extend downwardly around the opposite sides of the harvesting head of the vehicle, then below the harvesting head, and then inwardly toward one another at their lower ends which are spaced apart a short distance. The lower ends are adapted to embrace the opposite sides of the crop row which the vehicle is following.

If the vehicle becomes misaligned, the yoke pivots about its pivotal axis much in the fashion of a pendulum, and the sensor senses the change in rotational position of the shaft. This causes a signal to be sent to the microprocessor which in turn causes correction of the steering of the vehicle so as to maintain the vehicle in proper alignment with the crop row.

The lower ends of the yoke extend forwardly and downwardly from the pivotal axis of the yoke. They are pivotally attached at their forward ends to the front edge of the harvesting head for pivotal movement about a vertical axis. This pivotal mounting permits the probe to swing back and forth about its horizontal axis at the top of the yoke in response to encountering misalignment of the vehicle with the row crop.

BRIEF DESCRIPTION OF THE DRAWINGS

FIG. 4 is a perspective view of the steering probe of the present invention.

DESCRIPTION OF THE PREFERRED EMBODIMENT

Figure 1:
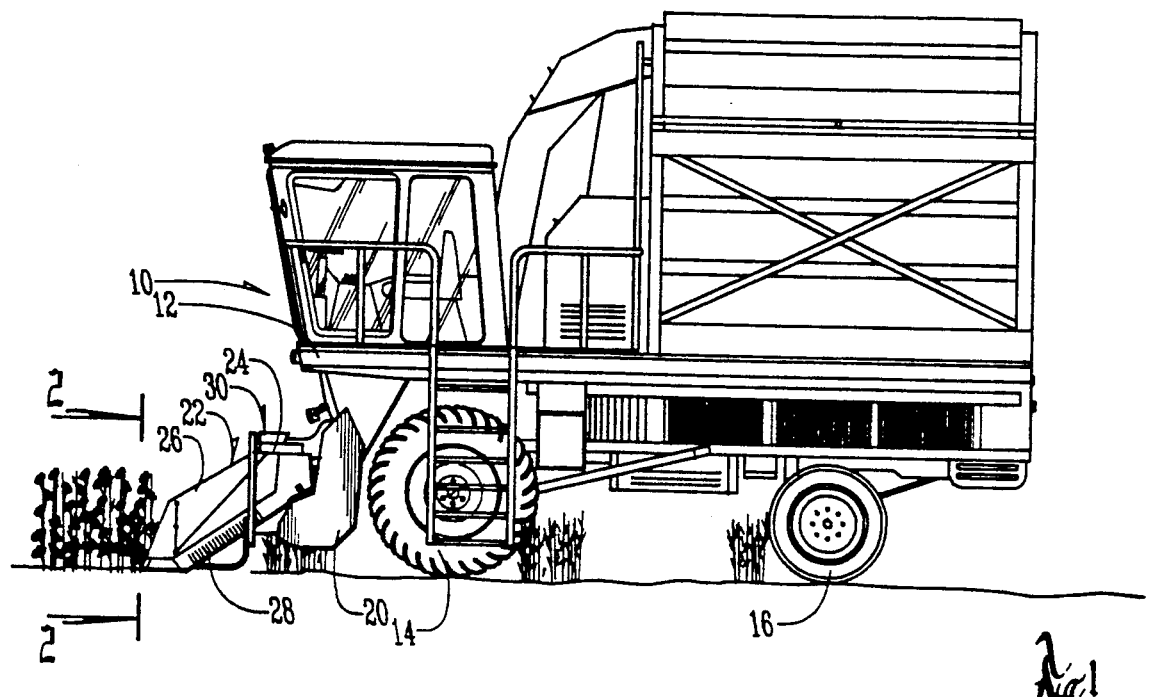
FIG. 1 is an elevational view of a vehicle having a cotton stripper on the front end thereof for harvesting cotton.

Referring to the drawings, the numeral 10 generally designates an agricultural vehicle having a cotton stripper mounted on the front thereof. Vehicle 10 includes a vehicle frame 12, drive wheels 14, and steering wheels 16. A steering cylinder 18 (FIG. 5) is connected to the steering wheels for controlling the turning of the steering wheels.

Mounted to the front of vehicle 10 is a stripper head 20 having a plurality of row units 22 mounted to the front thereof. The row units 22 are independently vertically adjustable so as to accommodate the proper level for each row. Each row unit includes a row unit frame 24 having a pair of spaced apart gathering shoes 26 extending forwardly and downwardly therefrom. Between the gathering shoes 26 are a pair of rotatable stripping brushes 28 which are adapted to engage the cotton bolls on cotton plants 29 for removing the cotton bolls.

Mounted to the row unit frame 24 is a steering probe 30. Steering probe 30 includes a pivot box 32 which is bolted or otherwise rigidly secured to row unit frame 24. Pivotally extending within pivot box 32 is a pivot shaft 34 which is rotatably supported by a front bearing 36 and a rear bearing 38. The inner end of shaft 34 is retentively inserted within a sensor 40. Sensor 40 is a rotary potentiometer manufactured by Novtechnik U.S. inc., Marlborough, Mass., under Model No. SP 284A502. This rotational potentiometer 40 is adapted to sense the rotational position of shaft 34 and to produce an electrical signal in electrical wire 46 which leads to a microprocessor 78 for controlling the steerage of the vehicle.

Attached to the forward end of shaft 34 is a yoke 42 which is held in place by a bushing 44. Shaft 34 is hexagonal in cross section, and is matingly fitted within a corresponding opening in yoke 42 so that the yoke 42 and the shaft 34 will rotate in unison about the horizontal longitudinal axis of shaft 34.

Figure 2:
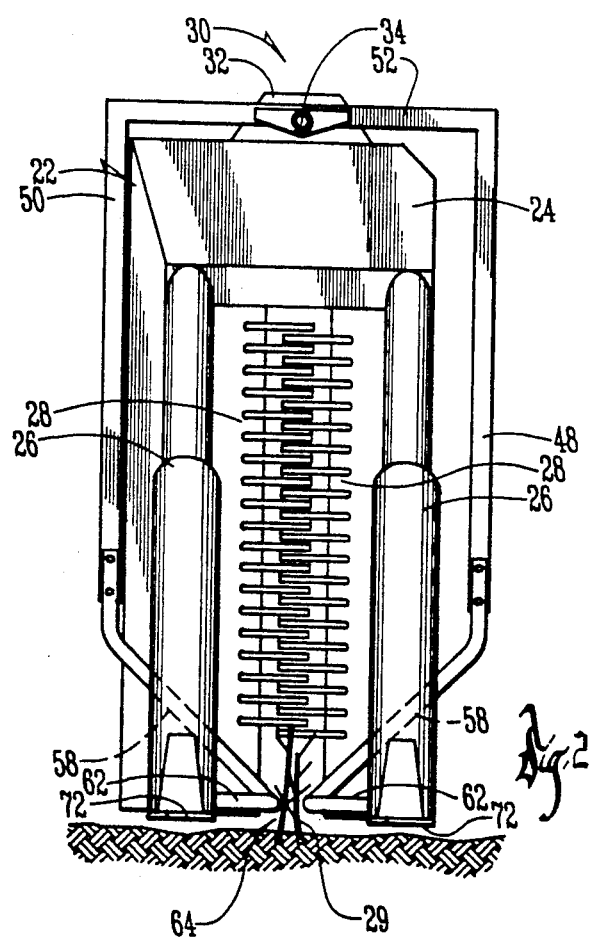
FIG. 2 is a front elevational view taken along line 2—2 of FIG. 1.

Yoke 42 includes a pair of spaced apart arms 48, 50 which at their upper ends are connected by a connecting member 52 which is attached to pivot shaft 34. The lower ends of arms 48, 50 are connected to arm extension bars 54, 56 each of which include an inwardly angled portion 58, a parallel portion 60, and a diverging portion 62. The parallel portions 60 form a guide channel 64 which is adapted to receive the lower most ends of the stems of cotton plants 29 as shown in FIG. 2. In FIG. 2, the upper most portions of cotton plants 29 have been cut away so as to show the stripping brushes 28 and the gathering shoes 26 more fully. Normally, the cotton stripper does not cut off the cotton plants.

Figure 3:
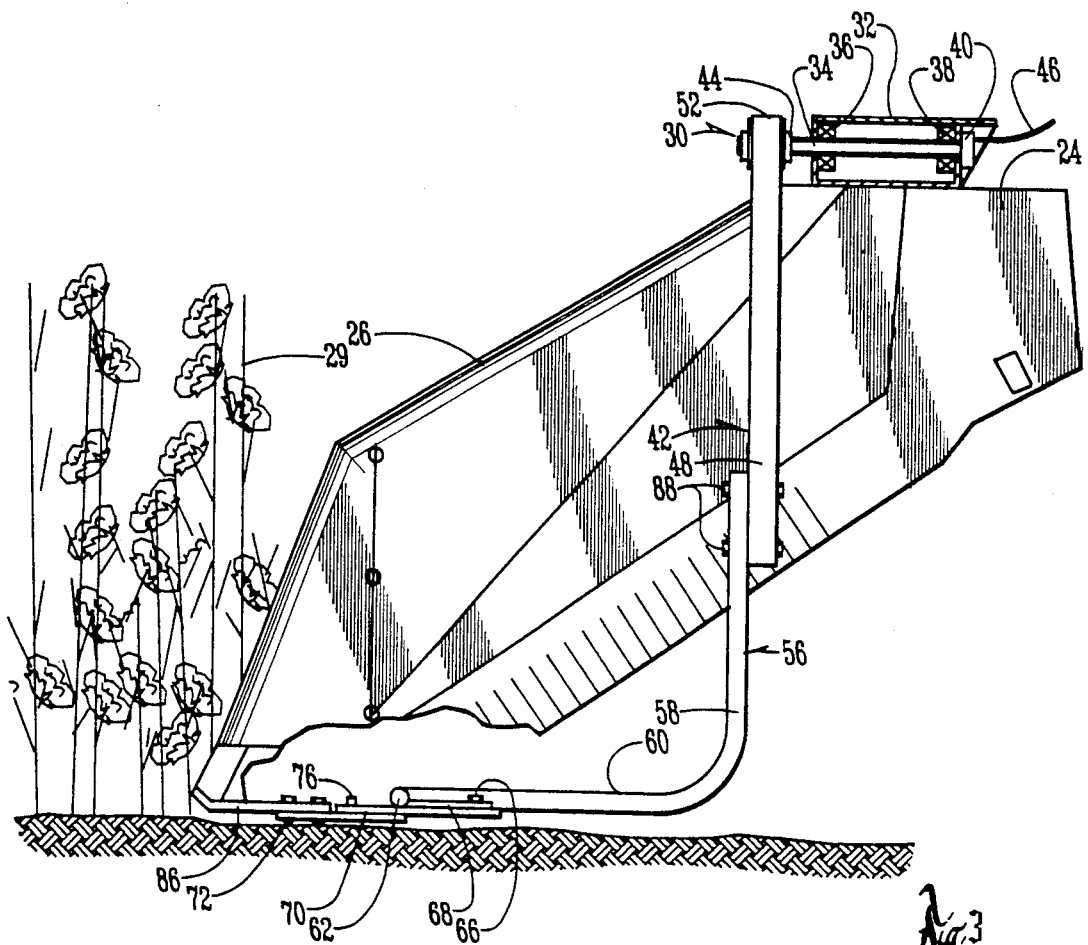
FIG. 3 is an enlarged side elevational view showing the details of the steering probe mounted on the front of the cotton stripper.

Referring to FIG. 4, the diverging portions 62 at the lower ends of arm extension bars 54, 56 have welded thereto a pair of tabs 68 which are pivotally connected to a pair of forwardly extending connecting straps 70 by means of bolts 66. The forward ends of connecting straps 70 include an aperture therein for receiving an upstanding pin 76 of one of the skid plates 72. Skid plates 72 are adapted to be mounted to a bracket or shoe 86 (FIG. 3) which is rigidly connected to the lower forward edge of row unit 22. The straps 62, because they are pivotally mounted at both their forward ends with respect to pins 76 and their rear ends with respect to bolts 66, are able to permit lateral swinging movement of the parallel portions 60 of arm extension bars 54, 56. The upper ends of extension bars 54, 56 are connected to the lower ends of arms 48, 50 by means of bolts 88 so as to create a single unitary yoke 42.

Figure 5:
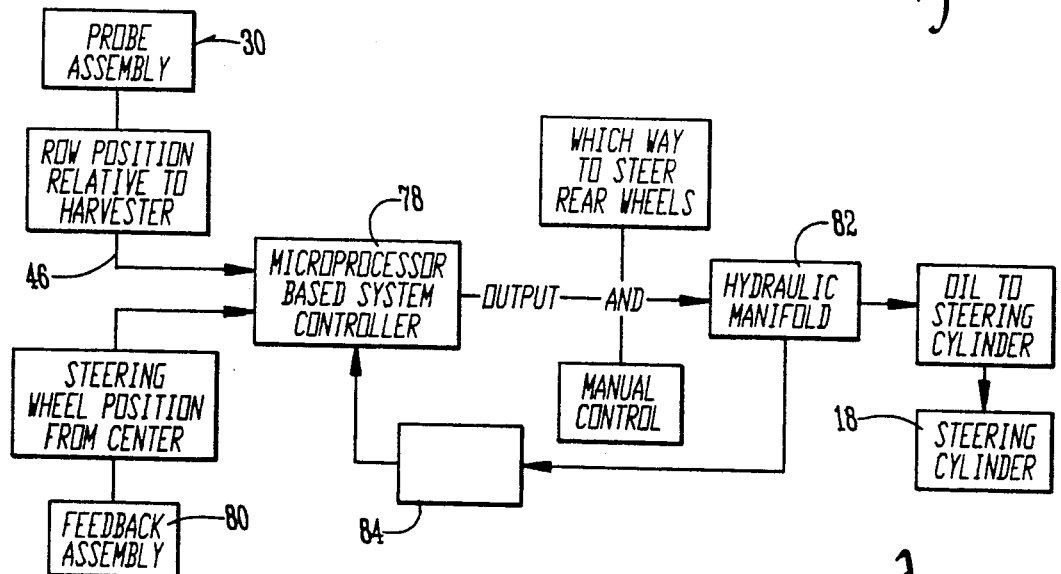
FIG. 5 is a block diagram showing the steering control system for the vehicle of FIG. 1.

Referring to FIG. 5, the probe assembly 30 is connected by means of a wire 46 (FIG. 4) to a microprocessor 78 which is adapted to control the steerage of the vehicle. The microprocessor 78 is also connected to a feedback assembly 80 which is in turn connected to the steering wheels 16 and which communicates to the microprocessor 78 the relative position of the steering wheels 16. The microprocessor is connected to the hydraulic manifold 82 which also is connected to the manual steerage system 92. From the hydraulic manifold, oil is sent to the steering cylinder which causes the steering of the wheels 16.

Whenever the manual steering control is manipulated, a manual override circuit 84 sends a signal back to the microprocessor for causing the microprocessor to shut off the automatic steering controlled by the probe assembly 30. However, when the vehicle 10 is in the automatic control system mode, the probe assembly provides information to the microprocessor telling the microprocessor whether or not the vehicle is properly aligned with the row of cotton plants 29. If the vehicle is properly aligned, the yoke 42 is in its normal vertical neutral position. However, if the vehicle becomes misaligned, the cotton plants which are within the guide channel 64 cause the probe 42 to pivot about shaft 34 in a pendulum fashion. This causes the shaft to rotate the potentiometer 40 thereby generating a single signal through wire 46 to microprocessor 78, and causing the microprocessor to actuate the steering cylinder 18 to correct for the misalignment.

The probe of a present invention provides a substantial improvement over probes used in other automatic guidance systems. One particular advantage is the location of the shaft 34 and the pivot box 32, as well as the potentiometer 40 well above and away from the plants 29 and from the dirt and dust found below the row unit. In prior devices, the pivotal axis of the various probes are located closely adjacent the plants, and often become fowled or damaged by the plants and by dirt and dust as the vehicle passes through the field. The location of the shaft 34 above the stripping head keeps the sensor 40 away from the plants and provides for a more reliable and durable guidance control system.

Another advantage obtained with the present invention is the fact that the lower ends of the yoke 30 are positioned on opposite sides of the crop row. Thus, they are able to quickly sense whether or not the vehicle is misaligned either to the right or the left of the row. Many prior sensing probes did not include two spaced apart probes which are on opposite sides of the row being used for guiding the vehicle.

By pivotally attaching the forward ends of the yoke 30 to the bracket or shoe 86 located at the forward end of row unit 22, considerable stability is provided to the guidance control system and damage from the plants is minimized.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. A steering probe for facilitating the steering of a vehicle along a path corresponding to an elongated row of upstanding objects extending upwardly from the ground, said vehicle comprising a vehicle frame having front and rear ends, ground engaging wheels supporting said frame, steering mechanism for steering said wheels, and steering control means for controlling said steering mechanism, said probe comprising:

a yoke having spaced apart yoke arms, each having a pair of upper and lower ends, a yoke connection member connecting said upper ends of said yoke arms, said lower ends of said yoke arms being spaced apart from one another so as to be capable of being positioned on opposite sides of said row of upstanding objects;

pivot means for pivotally mounting said yoke to said vehicle for pivotal movement about a horizontal axis extending in the same general direction as said path of said vehicle, said horizontal axis being positioned above said lower ends of said yoke arms;

sensor means for sensing the rotational position of said yoke about said horizontal axis relative to said vehicle and for creating a data signal corresponding to said rotational position of said yoke;

connecting means for connecting said sensor means to said steering control means for carrying said data signal to said steering control means.

2. A steering probe according to claim 1 wherein said yoke arms each extend downwardly and forwardly from said pivot means.

3. A steering probe according to claim 2 wherein said yoke arms include inwardly extending portions extending toward one another between said upper and lower ends thereof.

4. A steering probe according to claim 3 wherein said lower ends include outwardly extending portions extending away from one another.

5. A steering probe according to claim 1 wherein a harvesting device is operatively mounted on said vehicle and includes at least a portion thereof located between said yoke arms, said harvesting device being positioned to engage said row of upstanding objects when said lower ends of said yoke arms are positioned on opposite sides of said row of upstanding objects.

6. A steering probe according to claim 5 wherein said upper ends of said spaced apart yoke arms are above said portion of said harvesting device and extend downwardly around the opposite sides of said portion of said harvesting device, then below said portion of said harvesting device, and then towards one another adjacent said lower ends of said yoke arms.

7. A steering probe according to claim 6 wherein sensor means is positioned above said lower ends of said yoke arms.

8. A steering probe according to claim 1 wherein said pivot means comprises a horizontal shaft fixed to said yoke and extending along said horizontal axis, said shaft being connected to said sensor means whereby said sensor means will sense rotation of said shaft in response to pivotal movement of said yoke about said horizontal axis.

* * * * *